June 17, 1924.  1,498,136

F. VAN DE WIEL

SUSPENSION OF ELECTRODE PLATES IN ELECTRIC ACCUMULATOR CELLS

Filed Sept. 18, 1920

Inventor
F. Van de Wiel
By H. R. Kerslake.
Attorney

Patented June 17, 1924.

1,498,136

UNITED STATES PATENT OFFICE.

FERNAND VAN DE WIEL, OF PARIS, FRANCE, ASSIGNOR TO COMPAGNIE GENERALE D'ELECTRICITE, OF PARIS, FRANCE.

SUSPENSION OF ELECTRODE PLATES IN ELECTRIC ACCUMULATOR CELLS.

Application filed September 18, 1920. Serial No. 411,300.

*To all whom it may concern:*

Be it known that I, FERNAND VAN DE WIEL, a subject of the King of Belgium, and resident of Paris, France, have invented certain new and useful Improvements in the Suspension of Electrode Plates in Electric Accumulator Cells, of which the following is a specification.

The present invention relates to improvements in the suspension of electrode plates in electric accumulator cells.

When the cells are made of glass, the electrode plates are generally suspended by their noses or ears directly on the edge of the cell. This suspension, which is evidently the simplest, is not possible when the cell is made either of a current-conducting material or of a substance having a low melting point.

In the first case, the plates would not be insulated from each other, and in the second case, heat propagating in the plate by soldering to the connecting bars, would entail a partial melting of the cell wall.

Heretofore, in similar cases, the electrode plates have been suspended on glass sheets resting on the bottom of the cell, with the result that the breadth of the element was materially enlarged and that the cost was increased.

The present invention has for its object a simple mode of suspension by which the electric insulation of the electrode plates is ensured without increasing the internal breadth of the element, whilst preventing, in the case of a material with low melting point, spreading of heat to the wall of the cell.

According to the invention, a battery receptacle formed of material of low melting point such as asphaltic products and the like, the melting point of which does not extend above 200° C. is combined with strips of pieces of insulating material having a high melting point and low heat conductivity, such as glass, disposed in such a manner as to prevent melting of the cell walls when soldering the connecting bars to the plates.

The invention is represented in the annexed drawing, in which Figs. 1 to 4 show, by way of example, several forms of execution of the improved suspension.

The same characters of reference designate similar parts in the different figures.

Figure 1:
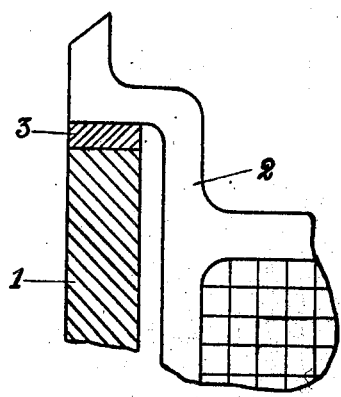

In Fig. 1, the wall of the cell is covered, on its upper edge, by a bar 3 made of glass or a similar material, on which the ear of plate 2 rests.

Figure 2:
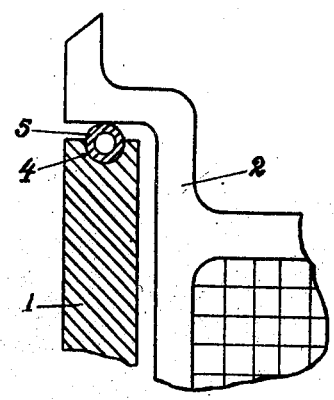

In Fig. 2, a longitudinal recess 4 of semi-circular cross-section, is provided in the upper edge of the wall of the cell 1, and serves as receptacle for a tube 5 made of glass or the like, on which the plates 2 are suspended.

Figure 3:
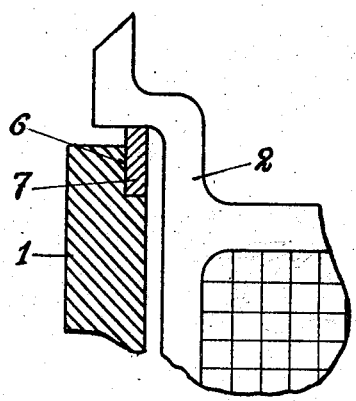

In Fig. 3, a longitudinal recess 6 is provided in the inner upper edge of wall 1 and receives a bar 7 or the like placed edgewise and supporting the plates.

Figure 4:
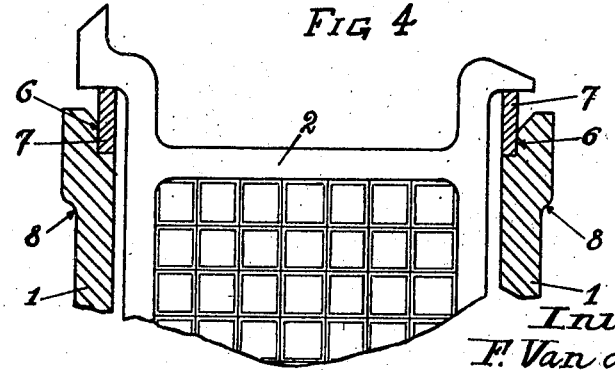

Fig. 4 shows an arrangement similar to that of Fig. 3, with the difference that in order to secure a greater mechanical strength of the wall 1, the latter is provided at its upper part with a boss 8, so that its thickness is not decreased opposite the recess 6.

It is well understood that other suspension devices of the same kind might be imagined without departing from the scope of the invention, the latter not being limited to the forms of execution shown and described, for instance, the cross-section of intermediary bodies 3, 5, 7 might be varied at will.

Having now particularly described and ascertained the nature of my said invention and in what manner the same is to be performed, I declare that what I claim is:

1. In a storage battery, a receptacle, the walls of which are integral with each other and composed of asphaltic material the melting point of which is below 200° C. and strips of glass having a high melting point and low heat conductivity located on and resting upon two of the upper opposite edges of the receptacle on which the battery plates rest.

2. In a storage battery, a receptacle, the walls of which are integral and composed of asphaltic material having a melting point below 200° C., internal shoulders formed near the upper edges of the two opposite walls of the receptacle and strips of glass possessing a high melting point and low heat conductivity fitted in said shoulders and projecting from the upper walls of the container and on which battery plates are adapted to rest.

In testimony whereof I have signed my name to this specification in the presence of two subscribing witnesses.

FERNAND VAN DE WIEL.

Witnesses:
RENE T. WITTEBACK,
M. C. HOUCK.